April 16, 1963 G. P. NISSEN ETAL 3,085,357
TEACHING AID FOR TUMBLING
Filed Aug. 16, 1961 2 Sheets-Sheet 1
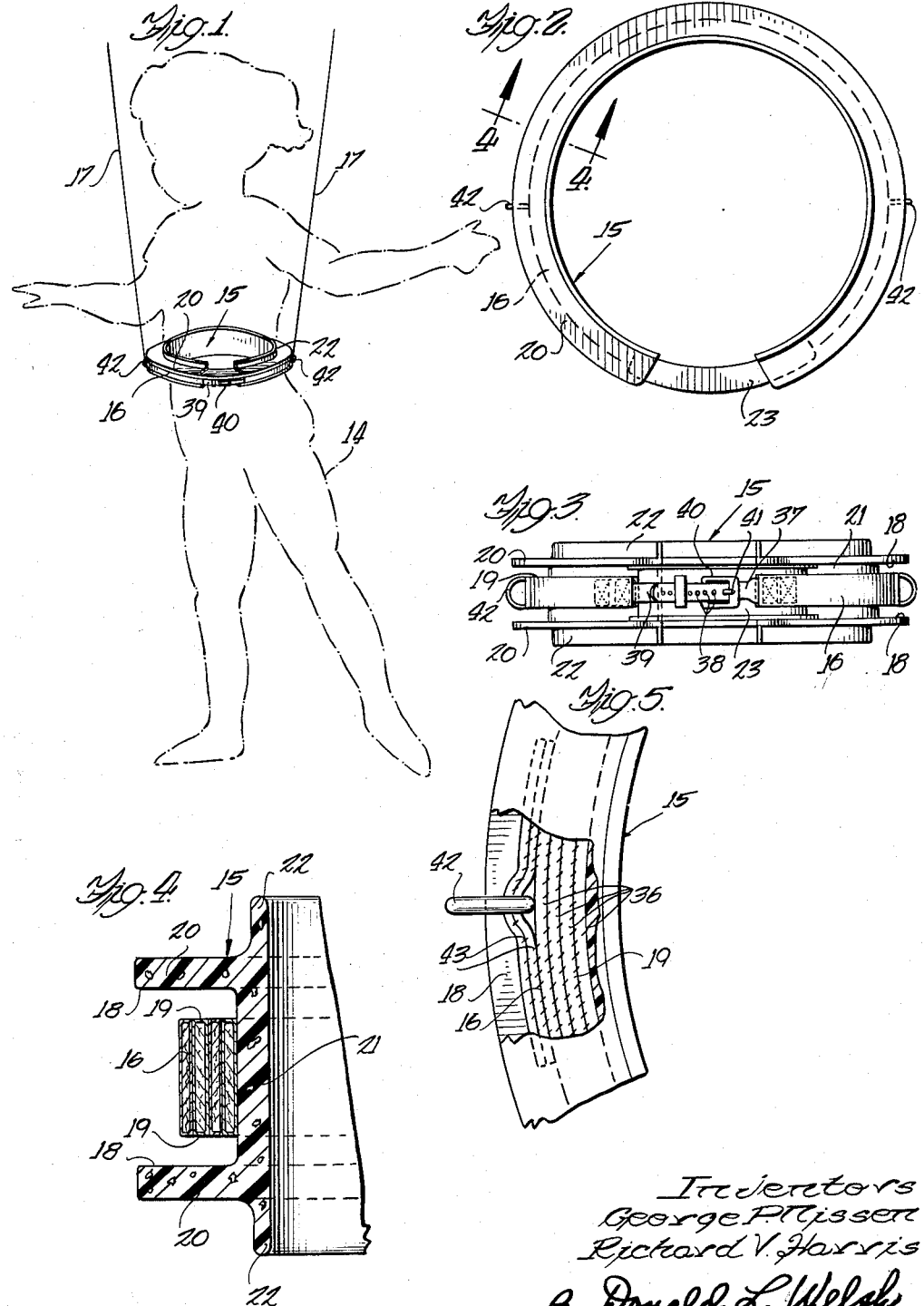

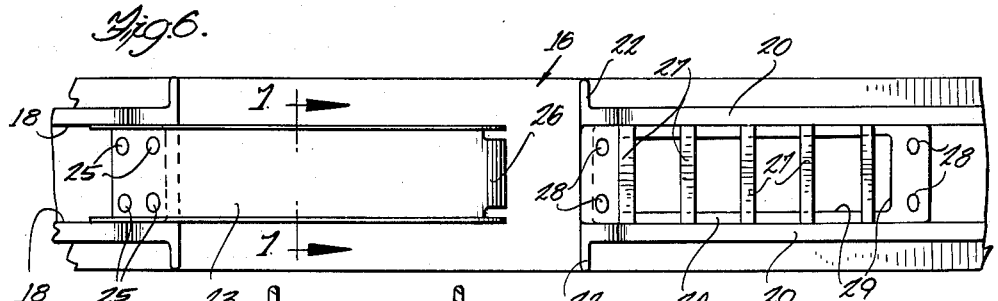
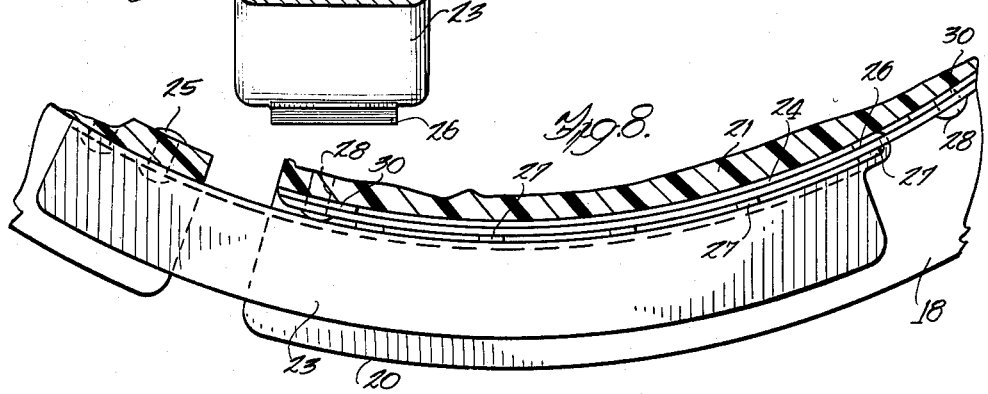
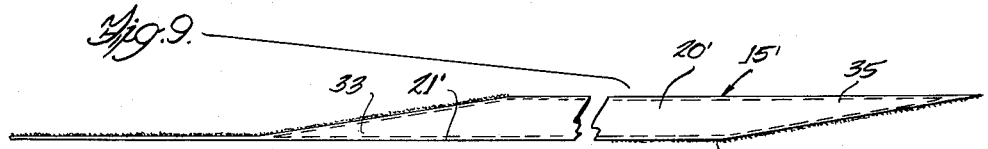
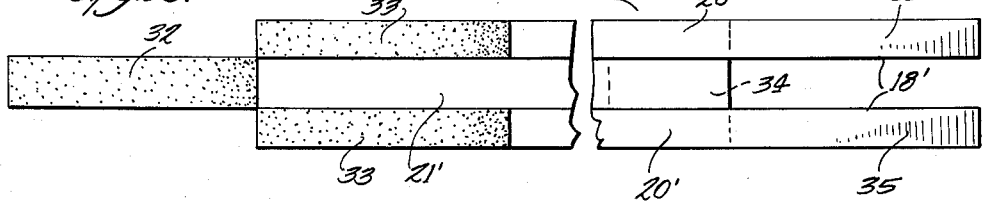
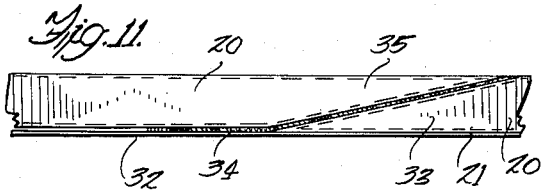

United States Patent Office

3,085,357
Patented Apr. 16, 1963

3,085,357
TEACHING AID FOR TUMBLING
George P. Nissen and Richard V. Harris, both of Cedar Rapids, Iowa, assignors to Nissen Corporation, Cedar Rapids, Iowa
Filed Aug. 16, 1961, Ser. No. 131,903
10 Claims. (Cl. 35—29)

The present invention relates generally to training apparatus for teaching acrobatics and, more particularly, to apparatus for supporting the weight of a student or user during tumbling exercises such as summersaults combined with body twisting movements, the apparatus being in the nature of a harness fitting around the waist of the user and adapted for connection to exterior cables or ropes by which the user may be suspended in the event of a fall or improper maneuver.

The primary object of the invention is to provide novel training apparatus of the above character which, compared with similar prior apparatus, is simpler and less expensive to construct while insuring the safety of the user in the event of an improper maneuver.

Another object is to form a training apparatus in a novel manner from flexible materials so as to reduce the possibility of injury to the user in the event of impact of the apparatus with a rigid surface.

A more detailed object is to provide tumbling training apparatus comprising only two concentric belts connected respectively to the cables and around the waist of the user and having overlapping surfaces permitting relative turning of the belts while preventing their movement axially out of the concentric relation.

The invention also resides in the formation of the belts from yieldable material to avoid injury to the user due to impact of the belts with a rigid surface. Other objects and advantages of the invention will become apparent from the following detailed description taken in connection with the accompanying drawings in which FIG. 1 is a perspective view of training apparatus embodying the novel features of the present invention and encircling the waist of an acrobat depicting in phantom.

FIG. 2 is a plan view of the apparatus.

FIG. 3 is a front elevational view of the apparatus.

FIG. 4 is a fragmentary sectional view taken along the line 4—4 of FIG. 2.

FIG. 5 is an enlarged fragmentary plan view of the apparatus with a part of the outer belt broken away and shown in section.

FIG. 6 is an enlarged fragmentary front elevation of the inner belt with its ends separated.

FIG. 7 is a fragmentary sectional view taken along the line 7—7 of FIG. 6.

FIG. 8 is a fragmentary enlarged plan view of the inner belt with some parts broken away and shown in section.

FIG. 9 is a fragmentary bottom plan view of an alternative form of outer belt.

FIG. 10 is an elevational view of the modified outer belt.

FIG. 11 is a fragmentary plan view of the modified outer belt in fastened condition.

The present invention is especially adapted for use in teaching acrobatics, particularly tumbling in which the performer or student (shown in phantom at 14) executes a maneuver such as either a frontward or backward summersault and, at the same time, twists about the longitudinal axis of his body. In general, the apparatus comprises a plurality of belts 15 and 16 encircling the waist of the user in the manner of a harness and adapted for connection to flexible supporting elements such as cables or ropes 17 which are held either by attendants or are suspended from overhead building structure. The purpose of the apparatus is to enable the user to perform the various maneuvers without resistance while having available the safety of suspension on the cables in the event of a fall or improperly executed maneuver. Usually, slack in the cables is taken up by attendants without sustaining the weight of acrobat unless the acrobat executes a manuever improperly. When that occurs, the weight of acrobat is transferred through the belts to the cables.

In accordance with the present invention, the desired protection for the acrobat is achieved with only two belts or encircling members 15 and 16 which are constructed in a novel manner to adjust to waists of different sizes and still permit the desired movements of the acrobat about his longitudinal axis and also about a transverse axis. To achieve these ends, the belts encircle the waist of the user in concentric relation and are formed with opposed surfaces 18 and 19 facing longitudinally of their common axis and overlapping each other radially. These surfaces confine the belts against movement axially relative to each other and out of their concentric relation while acting as bearings permitting the outer belt to turn relative to the inner belt about the common axis.

Herein, there are two bearing surfaces 18 formed on one of the belts 15 and 16 and facing each other to define a channel to receive the bearing surfaces 19 on the other belt. While the channel defining surfaces may be formed on either belt, it is preferred to form them on the inner belt 15 and to simplify the construction by making the outer belt 16 narrower than the channel so that it fits into the channel, axially facing edges of the outer belt constituting the other bearing surfaces 19. To avoid injury to the acrobat resulting from contact of the belt with rigid surfaces such as floors, the belts are formed of flexible or relatively soft material which yields upon impact.

The inner belt 15 in the preferred form shown in FIGS. 1 to 8 in this instance is formed by extruding a suitable yieldable plastic material such as polyethylene. The extrusion is of channel cross section with parallel flanges 20 projecting radially and outwardly from a bottom wall 21 and providing the opposed bearing surfaces 18. Extensions 22 of the bottom wall 21 extend beyond the flanges and flex to adapt to the contour of the user's waist and avoid sharp corners which might be painful to the user. The extrusion is of generally annular shape and its ends are fastened releasably together around the waist of the acrobat by means of a buckle 23, 24. To accommodate waists of different girth and still achieve a close fit around the acrobat, the belt is made of adjustable length, this being achieved by constructing the buckle in two parts which are adapted to fit each other in different positions providing different circumferences of the belt.

In the present instance, one inner belt buckle part 2 is formed as an arcuate member of channel cross section having one end portion fitting against the bottom wall 21 and within the channel between the flanges 20 at one end portion of the inner belt 15 and secured thereto as by rivets 25. The other end portion of the channel projects beyond the adjacent end portion of the belt and its bottom wall is formed with a projection bent reversely and inwardly to form a hook 26. The hook is adapted to fit around any one of a plurality of cross bars 27 on the other buckle part 24. The latter is a strip of elongated rectangular shape having a curvature corresponding to that of the first buckle part and secured at opposite ends as by rivets 28 to the outer side of the bottom wall 21 of the inner belt at its other end portion, the cross bars being secured to opposite edges of the strip and spanning a rectangular center cutout portion 29.

To provide space between the cross bars 27 and the bottom inner belt wall 21 to receive the hook 26, the bars are located on the outer side of the rectangular strip of the second buckle part 24 and spacer plates 30 are secured to the end portions of the strip on its inner side to space the strip from the wall. The bars thus are spaced from and extended transversely of the bottom wall to receive the hook at different positions spaced different distances from the adjacent end of the inner belt. With the construction, the channel part 23 of the buckle overlies the other part and forms, in effect, an extension of the channel of the belt. Both buckle parts herein are formed of a suitable metal.

In a modified form of inner belt 15' shown in FIGS. 9, 10 and 11, the opposed bearing surfaces 18' defining the channel are formed on the inner sides of two ribs 20' of rectangular cross section projecting outwardly beyond a bottom wall 21', the parts which correspond to parts of the preferred inner belt 15 bearing similar but primed reference characters. The ribs in this instance are formed of strips of yieldable plastic foam, for example, that known under the trade name "Ethafoam," covered by a thin sheet of material such as nylon. A flat strip of a canvas sewn to the coating for the ribs provides the bottom wall 21' of the channel.

The opposite end portions of the modified inner belt 15' are secured together releasably and adjustably by a nap type of fastener sold under the trade name "Velcro" by American Velcro Inc. having sales offices at 681 Fifth Avenue in New York, New York. As is well known, this material comprises small barbs projecting from one of two parts to be fastened together and interengageable releasably with nap on the other part. Herein, the barbed portion is secured to the outer sides of an extension 32 of the bottom wall and tapering end portions 33 of the ribs 20'. The nap is located on the inner side of the bottom wall as indicated at 34 and the inner sides of reversely tapered portions 35 of the ribs projecting beyond the bottom wall at the other end portion of the belt. With the taper, the end portions of the ribs may overlap each other without increasing the overall thickness of the belt at the position of overlap as indicated in FIG. 11.

The outer belt 16 may take various forms but, as indicated above, preferably is narrower than the channel between the flanges 20 of the inner belt 15 so as to fit within the channel. The construction is simplified by making the outer belt of rectangular cross section. In the present instance, such cross section is obtained by overlapping a plurality of strips 36 of thin webbing material and sewing such strips together. Such strips are shown in the drawings, the innermost two being of heavy cotton material and the outermost two on the inner and outer sides of the belt being formed of nylon which slips more easily relative to the inner belt. Opposite ends of the sewn strips are secured respectively to a strip 37 of material such as leather with spaced perforations 38 (FIG. 3) along its length and another strip 39 having a buckle 40 of the common type with a tine or prong 41 adapted to fit into any one of the holes to provide different lengths of the outer belt corresponding to the different lengths of the inner belt.

Fastening elements 42 are secured to and project from spaced portions of the outer belt 16 for attachment to the cables 17. In the present instance, these elements are formed as rings of wire of D shape. Each ring is secured against the outer side of the outermost strip 36 of webbing by two overlapping webbing strips 43 (FIG. 5) which extend through the ring and are sewn at opposite ends to the outer belt. The spacing of the rings is such that they are located at approximately diametrically opposed portions of the outer belt in its different positions of adjustment.

When it is desired to use the improved teaching apparatus, the acrobat 14 first fits the inner belt 15 closely about his waist, the close fit being achieved by interlocking the hook 26 on the channel buckle part 23 with the appropriate cross bar 27 on the other buckle part 24. Next, the outer belt 16 is fit around the inner belt and within the channel between the flanges 20 and its end strips 37 and 39 are secured releasably together by the buckle 40 to provide a reasonably tight fit while permitting turning of the outer belt relative to the inner belt. Then, the belts are ready for use with the D-rings 42 secured to the cables 17.

With the belts 15 and 16 fitted properly about the acrobat's waist and an attendant keeping the cables 17 free of slack, the acrobat may execute maneuvers such as somersaults without interference from the belts, such turning about a transverse axis of the user being permitted by twisting of the cables. At the same time the acrobat may turn about his longitudinal axis, the inner belt turning with the acrobat and relative to the outer belt during this maneuver. In the event that the acrobat loses control or executes a maneuver improperly so as to tend to fall, one of the flanges 20 on the inner belt will engage the outer belt to transfer the weight of the acrobat to the cables and the acrobat will be suspended thereby in a safe position above the floor or apparatus on which he may be working.

It will be apparent that the improved acrobatic training apparatus described above is of simple construction comprising essentially only the two belts 15 and 16. By virtue of their radially overlapping and opposed bearing surfaces 18 and 19, these belts will protect the acrobat but may be made of adjustable lengths to accommodate acrobats of different sizes. The formation of both belts from yieldable material provides additional protection to the user by preventing injury resulting from impact with rigid surfaces.

While the invention is susceptible of various modifications and alternative constructions, the preferred embodiments are shown in the drawings and are described herein in detail. It is to be understood, however, that such disclosure is not intended to limit the invention but, that the aim is to cover all modifications and alternative constructions falling within the spirit and scope of the invention as expressed in the appended claims.

We claim as our invention:

1. Acrobatic teaching apparatus having in combination an annular inner belt of channel cross section adapted to fit around the waist of an acrobat with parallel flanges projecting radially and outwardly from the belt, said belt having releasable buckle means connecting its ends and adjustable to change the effective length of the belt to fit closely around different sized waists, and an annular outer side belt extending around the outer side of said inner belt in concentric relation therewith and having oppositely facing surfaces opposing and disposed between said flanges to maintain the belts in concentric relation while permitting the outer belt to rotate freely with respect to the inner belt, said buckle means comprising a first part in the form of an arcuate channel secured to and projecting beyond one end portion of said inner belt and having flanges overlapping said belt flanges and receiving said outer belt, an elongated second part secured to the other end portion of said inner belt and having cross bars spaced from and extending transversely of the inner belt on its outer side between said flanges and spaced along the belt, and a hook on the projecting end of said first part fitting around one of said bars to secure the parts together around the waist of a user while being releasable to fit around other bars to change the length of said inner belt.

2. Acrobatic teaching apparatus having in combination an inner belt comprising an elongated strip of extruded plastic of channel cross section having an annular form to fit around the waist of an acrobat with parallel axially spaced flanges projecting radially and outwardly from the belt, said belt having releasable buckle means connecting its ends and adjustable to change the effective length of the belt to fit closely around different sized waists, an outer belt narrower than the spacing of said flanges extending around the outer periphery of said inner belt between said flanges and having releasable fastening means connecting its ends and adjustable to different lengths corresponding to the different lengths of the inner belt with the outer belt disposed between the flanges but rotatable freely with respect to the inner belt, and fastening elements connected to said outer belt at angularly spaced points and adapted for connection to elongated flexible tension members such as cables to support the weight of the user in the event of a fall.

3. Acrobatic teaching apparatus having in combination an annular inner belt of channel cross section adapted to fit around the waist of an acrobat with parallel flanges projecting radially and outwardly from the belt, an outer belt narrower than the spacing of said flanges extending around the outer periphery of said inner belt between the flanges and rotatable freely with respect to the inner belt, and fastening elements connected to said outer belt at angularly spaced points and adapted for connection to elongated flexible elements such as cables to support the weight of the user in the event of a fall.

4. Acrobatic teaching apparatus having in combination an inner belt comprising an elongated strip of extruded plastic of channel cross section having an angular form to fit around the waist of an acrobat with parallel flanges projecting radially and outwardly from a bottom wall of the channel, said belt having releasable buckle means connecting its ends and adjustable to change the effective length of the belt to fit closely around different sized waists, and an annular outer belt encircling said inner belt and having oppositely facing surfaces opposing and disposed between said flanges to maintain the belts in concentric relation while permitting the outer belt to rotate with respect to the inner belt, said bottom wall projecting beyond said flanges and flexing to adapt to the contour of the user's waist and avoid sharp corners uncomfortable to the user.

5. Acrobatic teaching apparatus having, in combination, an annular inner belt of channel cross section and adjustable length adapted to fit closely around the waist of a student with parallel flanges projecting radially and outwardly from the belt, an outer belt narrower than the spacing of said flanges telescoping around said inner belt in concentric relation therewith between the flanges and having an adjustable length to fit closely around the inner belt while being rotatable relative to the inner belt, opposed axially facing annular surfaces on said flanges and said outer belt overlapping each other radially and interengageable to prevent relative movement of the belts out of their concentric relation, and fastening elements on said outer belt at angularly spaced points adapted for connection to flexible elements for supporting the weight of the student in the event of a fall.

6. Acrobatic teaching apparatus having, in combination, an inner belt of adjustable length adapted to fit closely around the waist of a student, an outer belt telescoping around said inner belt in concentric relation therewith and having an adjustable length to fit closely around the inner belt while being rotatable relative to the inner belt, opposed axially facing first annular surfaces on one of said belts defining a channel, the other of said belts having axially facing surfaces disposed between and overlapping said first surfaces radially and engageable therewith to prevent relative movement of the belts out of their concentric relation, and attaching elements on said outer belt at angularly spaced points adapted for connection to flexible tension members for supporting the weight of the student in the event of a fall.

7. Acrobatic apparatus having, in combination, an inner annular belt adapted to fit around the waist of an acrobat, an outer annular interrupted belt encircling the inner belt in concentric relation therewith and having end portions connected releasably to permit removal of the outer belt from the inner belt, radially overlapping and axially facing surfaces on said belts permitting turning of the outer belt with respect to the inner belt while retaining the belts in their concentric relation, and attaching elements on said outer belt at angularly spaced points adapted for connection to tension members for supporting the weight of the acrobat in the event of an improper maneuver.

8. Acrobatic apparatus having, in combination, an inner annular belt adapted to fit around the waist of an acrobat, an outer annular belt encircling the inner belt in concentric relation therewith, and radially overlapping and axially facing surfaces on said belts permitting turning of the outer belt with respect to the inner belt while retaining the belts in their concentric relation, said belts being formed of yieldable material to avoid injury to the acrobat resulting from impact of the belt with a rigid surface.

9. Acrobatic apparatus having, in combination, an inner annular belt adapted to fit around the waist of an acrobat, an outer annular interrupted belt encircling the inner belt in concentric relation therewith and having releasably connected end portion, and radially overlapping and axially facing surfaces on said belts permitting turning of the outer belt with respect to the inner belt while retaining the belts in their concentric relation.

10. The combination of claim 9 in which the length of each of said belts is adjustable in increments and the increments of adjustment of the outer belt correspond with those of the inner belt so that the desired concentric relation of the belts is retained with different lengths of adjusment of the inner belt.

References Cited in the file of this patent
UNITED STATES PATENTS
2,496,748     Pond ------------------ Feb. 7, 1950